(12) United States Patent
Jacobs

(10) Patent No.: US 7,197,578 B1
(45) Date of Patent: Mar. 27, 2007

(54) POWER MANAGEMENT SYSTEM FOR BRIDGE CIRCUIT

(75) Inventor: Daniel G. Jacobs, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 317 days.

(21) Appl. No.: 10/186,937

(22) Filed: Jun. 28, 2002

(51) Int. Cl.
*G06F 3/00* (2006.01)

(52) U.S. Cl. .................. 710/14; 710/305; 710/306

(58) Field of Classification Search ............ 710/62–64, 710/305–317, 8–14; 713/300–340
See application file for complete search history.

(56) References Cited

U.S. PATENT DOCUMENTS

| | | | | |
|---|---|---|---|---|
| 6,128,743 A | * | 10/2000 | Rothenbaum ............... | 713/300 |
| 6,151,651 A | * | 11/2000 | Hewitt et al. ............... | 710/315 |
| 6,438,701 B1 | * | 8/2002 | Chaiken et al. ............. | 713/323 |
| 6,442,631 B1 | * | 8/2002 | Neufeld et al. ............. | 710/107 |
| 6,523,125 B1 | * | 2/2003 | Kohno et al. ................ | 713/320 |
| 6,591,320 B1 | * | 7/2003 | Cheston et al. ............. | 710/104 |
| 6,607,139 B1 | * | 8/2003 | Jui-Chang et al. .......... | 235/492 |
| 6,633,938 B1 | * | 10/2003 | Rowlands et al. .......... | 710/240 |
| 6,725,385 B1 | * | 4/2004 | Chu et al. .................... | 713/320 |
| 2002/0040444 A1 | * | 4/2002 | Ohie et al. ................... | 713/322 |

* cited by examiner

*Primary Examiner*—Kim Huynh
*Assistant Examiner*—Eron Sorrell
(74) *Attorney, Agent, or Firm*—Marger Johnson & McCollom, P.C.

(57) ABSTRACT

A power control signal controls a low-power mode, a USB connection, and an asynchronous reset function for a bridge circuit. Another power control signal controls both a high power mode and a low power mode for an attached device. The two power control signals reduce the number of pins required on the bridge circuit for controlling its own power related operations and power related operations of the attached device.

25 Claims, 3 Drawing Sheets

POWER MANAGEMENT SYSTEM FOR BRIDGE CIRCUIT

BACKGROUND

A bridge circuit is used for communicating between a Universal Serial Bus (USB) and other bus protocols, such as an Advanced Technology Attachment (ATA) bus protocol. The bridge circuit and peripheral devices coupled to the bridge circuit can be independently powered, or powered from the USB bus. The bridge circuit can control its own power consumption and possibly power to the connected device.

Several pins are required on the bridge circuit for managing these different power configurations. These additional power management pins increase the cost and complexity of the bridge circuit and limit bridge circuit integration.

The present invention addresses this and other problems associated with the prior art.

SUMMARY OF THE INVENTION

A power control signal controls a low-power mode, a USB connection, and an asynchronous reset function for a bridge circuit. Another power control signal controls both a high power mode and a low power mode for an attached device.

The foregoing and other objects, features and advantages of the invention will become more readily apparent from the following detailed description of a preferred embodiment of the invention which proceeds with reference to the accompanying drawings.

DETAILED DESCRIPTION

Figure 1:
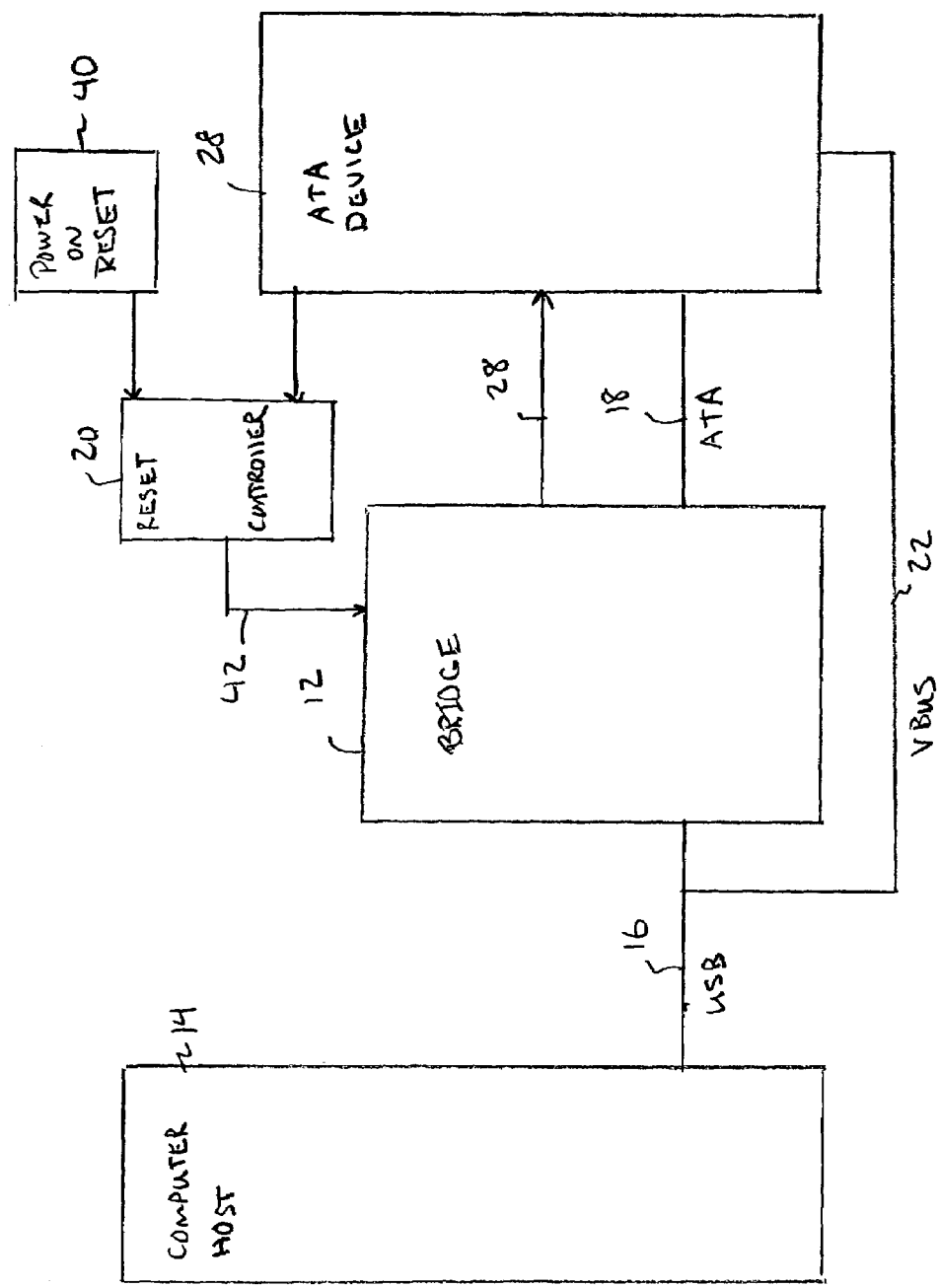
FIG. 1 is a block diagram of a USB-to-ATA bridge.

FIG. 1 shows a Universal Serial Bus (USB) to Advanced Technology Attachment (ATA) bridge 12. A host computer 14 includes a USB interface 16 that communicates with the bridge 12. The bridge circuit 12 also communicates with a device 28 over an ATA interface 18. The host 14 issues commands and data to the bridge 12 and receives status and data from the bridge 12 using a standard USB protocol.

The bridge 12 converts the USB commands and data into a format that complies with an American National Standards Institute (ANSI) ATA standard, for instance the standard "AT Attachment with Packet Interface Extension—(ATA/ATAPI-4)" or one of its predecessors. In one example, the device 28 may be an "ATA" device. The ATA standards define the physical, electrical, transport, and command protocols for the internal attachment of devices to computers via an ATA bus. Future ATA standards are also currently contemplated. Devices compliant with these standards may also be referred to as "ATA devices".

The bridge circuit 12 and the device 28 can be either self powered or receive power from a power line (VBUS) 22 on the USB interface 16. A reset controller 20 receives signals from a Power On Reset (POR) circuit 40 and the ATA device 28. The reset controller 20 generates a reset and power control signal 42 that controls a low-power mode, the connections on USB interface 16 and an asynchronous reset function for the bridge circuit 12. A power mode signal 28 output by the bridge 12 controls both a high power mode and a low power mode for the device 28. The two power control signals 42 and 28 reduce the number of pins required on the bridge 12 for controlling its own power related operations and power related operations of the device 28.

The power control system described below can be used for any other bridge or USB circuit in addition to the USB-to-ATA bridge shown in the drawings. The power control system is useful for any circuit that needs more efficient power control. In one example, the external signals coupled to the bridge 12 are associated with external pins on an integrated circuit. However, in alternative implementations, some or all of these signals may be internal signals in a host or ATA device.

Figure 2:
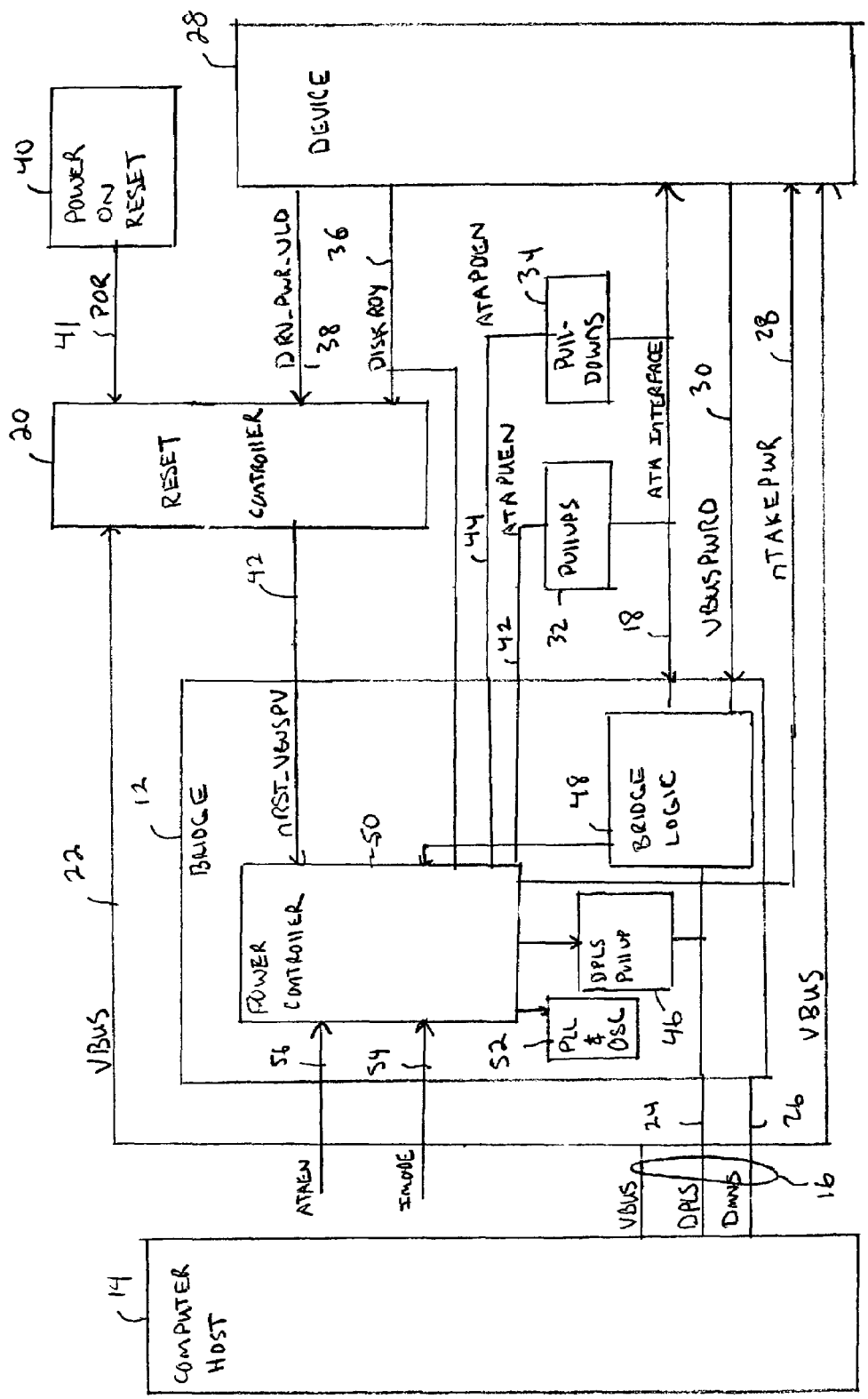
FIG. 2 is a more detailed block diagram of the bridge shown in FIG. 1.

FIG. 2 shows the functional blocks associated with the bridge 12. The bridge 12 includes both bridge logic 48 and a power controller 50. The bridge logic 48 performs the operations necessary for converting data and commands between the USB interface 16 and the ATA interface 18. This USB-to-ATA bridge logic 48 is known to those skilled in the art and is therefore not described in further detail.

The power controller 50 receives the reset and power control signal (nRST_VBUSPV) 42 from the reset controller 20 and generates the power mode signal (nTAKEPWR) 28 used for controlling the high power mode and low power mode for device 28. When the bridge 12 is in an I_MODE and the ATA device 28 is powered by VBUS 22, the ATA device 28 needs to know when it may draw 100 milliamps (mA). When I_MODE=1, the nTAKEPWR signal 28 provides this information. Otherwise nTAKEPWR 28 is only asserted when a non-zero USB configuration is set, a USB suspend condition is deactivated, and the last configuration descriptor sent to the host 14 was a bus powered configuration.

The USB interface 16 has two possible states. In a disconnected state, DPLS pull-ups 46 are disabled. The term DPLS refers to the D+ signal on the USB interface. In a connected state the pull-ups 46 are enabled, with the exception of high speed negotiation when the pull-ups 46 are disabled.

The ATA interface 26 has three states. An enabled state may be idle or active with the bridge circuit 12 acting as an ATA host. An ATAPUEN signal 42 drives pull-ups 32 high when the ATA interface 18 is enabled, drives pull-ups 32 low when the ATA interface 18 is in a power-off state, or tri-states pullups 32 when the ATA interface 18 is disabled. The ATAPDEN signal 44 drives pull-downs 34 low when the ATA interface 18 is enabled or in power-off state, and tri-states the pulldowns 34 when the ATA interface 18 is disabled. The ATAPDEN signal 44 is optional depending upon the required power management and required bus sharing states of the ATA interface 18.

The power controller 50 receives signals from the bridge logic 48 that are explained in further detail below in FIG. 3. The power controller 50 controls operation of a Phase Locked Loop (PLL) and oscillator circuit 52 and the DPLS pull-ups 46. The USB specification requires a bus-powered IMODE device (including the total system) to consume less than 100 mA. An IMODE signal 54 is received by the power controller 50 and enables the bridge 12 to receive configuration and USB descriptor data from the device 28 via a vender specific ATA command rather than an external memory device.

An ATAEN signal 56 allows other hosts to share the ATA bus connected to device 28. Asserting ATAEN causes the bridge 12 to tristate the ATA interface 18 and suspend communication with the ATA device 28. Otherwise, the bridge 12 is still operational to continue performing USB operations over USB interface 16. De-asserting the ATAEN signal 56 resumes normal operation on ATA interface 18.

The reset controller 20 receives the VBUS signal 22 from the USB interface 16 and a Power On Reset (POR) signal 41 from the POR circuit 40. The reset controller 20 also receives a DRV_PWR_VLD signal 38 and a DISKRDY signal 36 from the ATA device 28.

The DRV_PWR_VLD signal 38 is typically enabled only in hybrid powered systems where the bridge 12 receives power from the VBUS 22, and the device 28 receives power from another source. The DRV_PWR_VLD signal 38 is an indication of the power supply state of device 28.

The DRV_PWR_VLD signal 38 when not asserted causes the bridge 12 to go into a low power state of operation. In the low power state, the ATA interface 18 is put in a power-off mode. In the power off mode, the device 28 does not have any power. All signals connected to device 28 are therefore driven low to prevent back-powering to the unpowered device 28. In the low power state, the bridge 12 is dropped off the USB interface 16 by disabling DPLS pull-ups 46. The bridge 12 also turns off the Phase Locked Loop PLL and an oscillator circuit 52.

Asserting the DRV_PWR_VLD signal 38 allows the bridge 12 to depart from the low power state, take the ATA interface 18 out of a power-off state, and establish a USB connection over USB interface 16.

A DISKRDY signal 36 is typically used when the bridge 12, or other circuitry, controls power to the device 28. The DISKRDY signal 36 indicates that the device 28 has power. When the DISKRDY signal 36 is activated, the ATA interface 18 is taken out of a power-off state. When DISKRDY signal 36 is de-activated and the bridge circuit 12 goes into the low-power state, a filter output goes inactive asynchronously.

When the DISKRDY signal 36 is de-activated and the bridge 12 is not in the low-power state, the filter output goes inactive after passing through a simple meta-stability filter. When the DISKRDY signal 36 goes active, the filter performs a unanimous vote count of 25 milliseconds worth of clocks before the filter output goes active. This effectively adds together any PLL and oscillator ramp up time. This allows external "soft start" circuitry to slowly power up the device 28 before the bridge 12 drives any outputs on the ATA interface 18.

The VBUSPWRD signal 30 indicates an amount of system current drawn from the VBUS 22. Signal 30 is used to qualify a response for a GET_STATUS USB request from the host 14 and to qualify an asynchronous reset in the bridge 12. The bridge 12 is asynchronously reset when the VBUSPWRD signal 30 is activated and the host 14 has set the USB configuration for self powered operation. The bridge 12 is also asynchronously reset when the VBUSPWRD signal 30 is detected changing state when the USB configuration is set to zero. The VBUSPWRD signal 30 also qualifies which USB descriptors are presented by bridge 12 to the host 14. If asserted, a first descriptor set is returned. If de-asserted, a second descriptor set is returned.

Deactivating the VBUSPWRD signal 30 indicates the device 28 is self powered, and the entire USB device system should not draw power from VBUS 22 beyond 100 mA. Activating the VBUSPWRD signal 30 indicates the device 28 is capable of drawing up to an amount present in a Maxpower USB descriptor field from VBUS 22.

Figure 3:
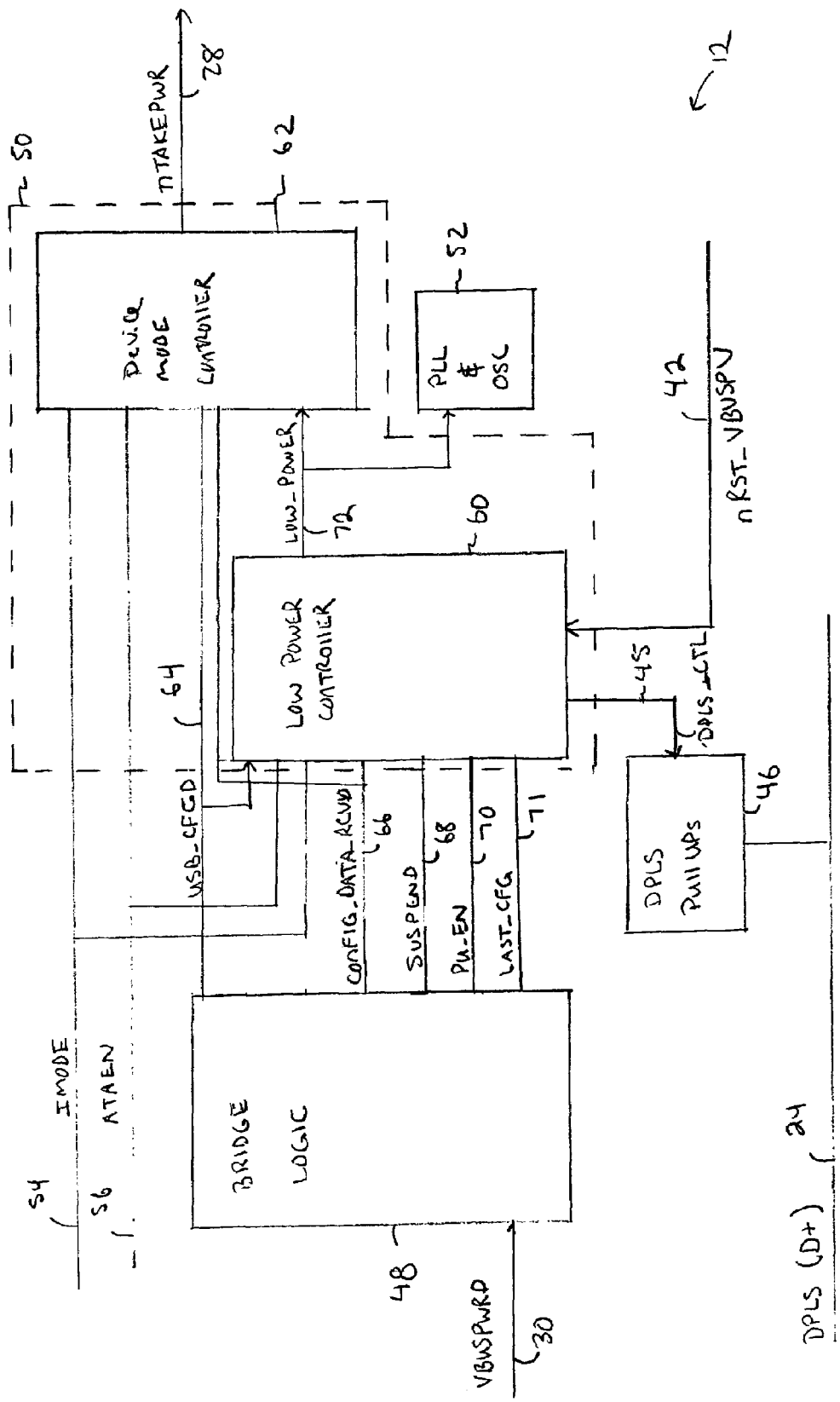
FIG. 3 is a detailed diagram of power control logic used in the bridge shown in FIG. 1.

FIG. 3 shows in more detail the power controller 50 in the bridge 12. A low power controller 60 and a device mode controller 62 each receive the IMODE signal 54 and ATAEN signal 56. A USB_CFGD signal 64, SUSPEND signal 68, CONFIG_DATA_RCVD signal 66, PU_EN signal 70, and LAST_CFG signal 71 are all generated from the bridge logic 48.

The USB_CFGD signal 64 indicates that the USB host 14 (FIG. 1) has accepted and set the last sent configuration on the bridge 12. The PU_EN signal 70 indicates that the bridge logic 48 is requesting enablement of the DPLS pull-up 46. The SUSPEND signal 68 indicates that the USB bus 24 is in a suspend state. The LAST_CFG signal 71 indicates that the last configuration descriptor sent to host 14 was the bus_powered descriptor. The CFG_DATA_RCVD signal 66 indicates that the bridge 12 has successfully read in (either from IMODE or EEPROM) bridge configuration bits.

A self reset is performed according to the VBUSPWRD signal 30, USB_CFGD signal 64, and LAST_CFG signal 64. When USB_CFGD=0 and VBUSPWRD changes state, the bridge 12 is asynchronously reset. When USB_CFGD=1 and VBUSPWRD goes inactive and LAST_CFG=1, then the bridge is also asynchronously reset. This self reset is similar to a power on reset. The DPLS pull-ups 46 are disabled and nTAKEPWR is tri-stated. This function is performed in the power controller 50 and uses the VBUSPWRD signal 30 shown in FIG. 3.

Low Power Signal

The low power controller 60 activates a LOW_POWER signal 72 during the low power state or when USB operations are suspended (SUSPEND signal 68 asserted). Activation of the LOW_POWER signal 72 turns off the PLL and oscillator circuit 52 regardless of USB remote-wakeup enabled status. This allows the bridge 12 to draw a minimal amount of current in either case.

When going into USB suspend, the oscillator 52 may not be turned off when enabled for USB remote wake-up, allowing the filters to function in remote wakeup. In an alternative implementation, the PLL and oscillator 52 are always turned off when LOW_POWER signal 72 is asserted and all filters except for DISKRDY 36 are bypassed.

The LOW_POWER signal 72, in one situation, is not asserted when the bridge configuration data has not been received and the CONFIG_DATA_RCVD signal 66 is not activated. The LOW_POWER signal is generated in one circumstance using the following logic. The terms "NOT", "OR", and "AND" represent logic operators which are known to those skilled in the art.

LOW_POWER="NOT" nRST_VBUSPV "OR" SUSPEND "AND"

"NOT" ("NOT" CONFIG_DATA_RCVD "AND" IMODE "AND" ATAEN)

The internal DPLS pull-up 46 controls the USB connection 24 and are enabled according to a DPLS-CTL signal 45. This self reset is similar to a power on reset where the DPLS pull-ups 46 are disabled and nTAKEPWR signal 28 is tri-stated. The DPLS-CTL signal 45 is activated in one example according to the following relationship.

DPLS-CTL=PU_EN "AND" nRST_VBUSPV

Device Mode Control

The device mode controller 62 generates the nTAKEPWR signal 28 that replaces a NPWR500 signal and a NLOWPWER signal previously used in USB-to-ATA bridge circuits.

The NLOWPWR signal, when active, indicated the bridge circuit 12 was in a low power mode. The NLOWPWR signal was used to control device 28 when operating in a 100 mA low power range and was required to transfer initialization data prior to USB configuration.

The nPWR500 signal indicated that the computer host 14 (FIG. 1) had configured the bridge 12 for VBUS powered operation. The NPWR500 signal was used to control ATA devices that operate in the 500 mA range. The NLOWPWR and NPWR500 signals were also used for controlling the device 28 when in a suspend mode of around 500 micro amps or 2.5 mA, if the host 14 has enabled USB remote-wakeup on the bridge 12. A USB remote-wakeup refers to a device that has been enabled (prior to suspend) to signal to the host 14 in order to cause the host to come out of suspend and resume normal USB traffic to the device 28.

The nTAKEPWR signal 28 controls USB power to the ATA device 28 or other external power management circuitry. The nTAKEPWR signal 28 is asserted when the bridge 12 has a non-zero USB configuration value set and is not in USB suspend mode. The USB configuration value is contained within a USB device's configuration descriptor. This value is written using the USB set configuration command to a register on the USB device 28. A value of zero mean the host 14 has not allowed the configuration yet. A USB suspend condition refers to the host 14 ceasing traffic including Start Of Frames (SOFs) for more than some specified period of time.

When set for IMODE, and ATAEN is active, the nTAKEPWR signal 28 will assert before an attempt is made to retrieve configuration bits from the ATA device 28. This allows the IMODE device to use up to 100 mA in order to transfer bridge configuration bits to the bridge. The IMODE signal 54, or shared pin, is used to distinguish nPWR500 and nLOWPWR functions in the bridge 12. The nTAKEPWR signal 28 is asserted according to the following:

nTAKEPWR=(CONFIG_DATA_RCVD "AND" "NOT" LOW_POWER "AND" (USB_CFGD "OR" IMODE)) "OR" ("NOT" CONFIG_DATA_RCVD "AND" IMODE "AND" ATAEN))

Reset Controller

Different variations of the logic inside the reset controller 20 (FIG. 2) are shown below.

nRST_VBUSPV=nPOR "AND" VBUS "AND" DISKRDY;

nRST_VBUSPV=nPOR "AND" VBUS "AND" DRV_PWR_VLD; or nRST_VBUSPV=nPOR "AND" VBUS

The reset controller 20 implements a function external to the bridge 12 and generates the reset and power control signal 42. The signal 42 controls both an asynchronous reset or controls the low power state in the bridge 12 to prevent a USB connect (i.e. DPLS pull-up activation) and conserve power for different events. The bridge 12 is reset and/or put into the low power state when VBUS=0, POR signal 41 from circuit 40 is activated, or when the ATA device 28 has no power.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A bridge circuit, comprising:
    a Universal Serial Bus (USB) interface;
    a power controller coupled to bridge circuitry and operating in a same integrated circuit containing the bridge circuitry, the integrated circuit outputting a power mode signal for controlling both a low-power mode and a high-power mode in a peripheral device external from the integrated circuit, the peripheral device connected to the Universal Serial Bus (USB) interface to draw power from the Universal Serial Bus (USB) interface, thereby bypassing the bridge circuitry; and
    a reset controller that generates a reset signal for controlling connectivity of the bridge circuitry with the Universal Serial Bus (USB) interface and controls an asynchronous reset in the bridge circuitry.

2. A bridge circuit according to claim 1 wherein the power mode signal is asserted according to a Universal Serial Bus (USB) configuration value and a suspend mode in the bridge circuit.

3. A bridge circuit according to claim 1 wherein the power mode signal controls the low power mode and the high power mode according to a configuration control signal.

4. A bridge circuit according to claim 3 wherein the power mode signal is asserted according to an Advanced Technology Attachment (ATA) interface control signal.

5. A bridge circuit according to claim 1 wherein the reset signal is activated according to a USB power line value.

6. A bridge circuit according to claim 1 wherein the reset signal is activated according to a power on reset signal.

7. A bridge circuit according to claim 1 wherein the reset signal is activated according to a power state of the peripheral device.

8. A bridge circuit according to claim 1 wherein the reset controller is external from the bridge circuit.

9. A bridge circuit according to claim 1 wherein the power controller initiates a low-power state according to the reset signal.

10. A bridge circuit according to claim 9 wherein the power controller turns off a phase locked loop and oscillator circuit and disables an Advanced Technology Attachment (ATA) interface in the low-power state.

11. A method for controlling power operations in a Universal Serial Bus (USB) bridge, comprising:
    monitoring a USB bus voltage signal and a device power status signal of a peripheral device;
    controlling both a low-power mode and a high-power mode in the peripheral device, the peripheral device connected to the USB bus voltage signal to draw power from a Universal Serial Bus (USB), thereby bypassing the bridge;

generating a reset signal or a low power signal in the USB bridge according to the monitored signals; and controlling connectivity of the USB bridge with a Universal Serial Bus (USB) interface according to a reset controller that generates the reset signal and controls an asynchronous reset in the bridge circuit.

12. A method according to claim 11 including holding the bridge in a reset state or a low power state when the device power status signal indicates a low power condition.

13. A method according to claim 11 including monitoring a power on reset signal and generating the reset signal or the low power signal when the power on reset signal indicates a reset condition.

14. A method according to claim 11 including generating the reset signal or the low power signal when the USB bus voltage signal indicates a USB bus voltage below a threshold value.

15. A method according to claim 11 including turning off a phase locked loop and oscillator circuit when the USB bridge is in a low power state.

16. A method according to claim 11 including generating a power mode signal for controlling both a low-power mode and a high-power mode for an Advanced Technology Attachment (ATA) device coupled to the USB bridge.

17. A Universal Serial Bus (USB)-to-Advanced Technology Attachment (ATA) bridge, comprising:

a Universal Serial Bus (USB) interface;

a power mode pin for controlling both a low-power mode and a high-power mode for an ATA device coupled to the bridge, the ATA device being connected to draw power directly from the Universal Serial Bus (USB) interface, bypassing any bridge circuitry; and a reset controller that generates a reset signal for controlling connectivity of the bridge circuit with a Universal Serial Bus interface and controls an asynchronous reset in the bridge circuit.

18. A bridge according to claim 17 including a reset pin that causes the bridge to go into an asynchronous reset or a low power state according to an ATA device connect signal, an ATA device power signal, and a USB bus voltage signal.

19. A bridge according to claim 17 wherein the power mode pin is activated according to a configuration control signal.

20. The bridge circuit according to claim 1 wherein a first signal is active only when the bridge circuit receives power from the USB interface and the device receives power from another source.

21. The bridge circuit according to claim 20 wherein the reset controller is responsive to the first signal.

22. The bridge circuit according to claim 1 wherein a second signal is active only when the bridge circuit controls power to the device.

23. The bridge circuit according to claim 22 wherein the reset controller is responsive to the second signal.

24. The bridge circuit according to claim 1 wherein the reset controller is responsive to whether the device is in the low-power mode.

25. The bridge circuit according to claim 24 wherein the device is an ATA device.

* * * * *